Patented Dec. 29, 1925.

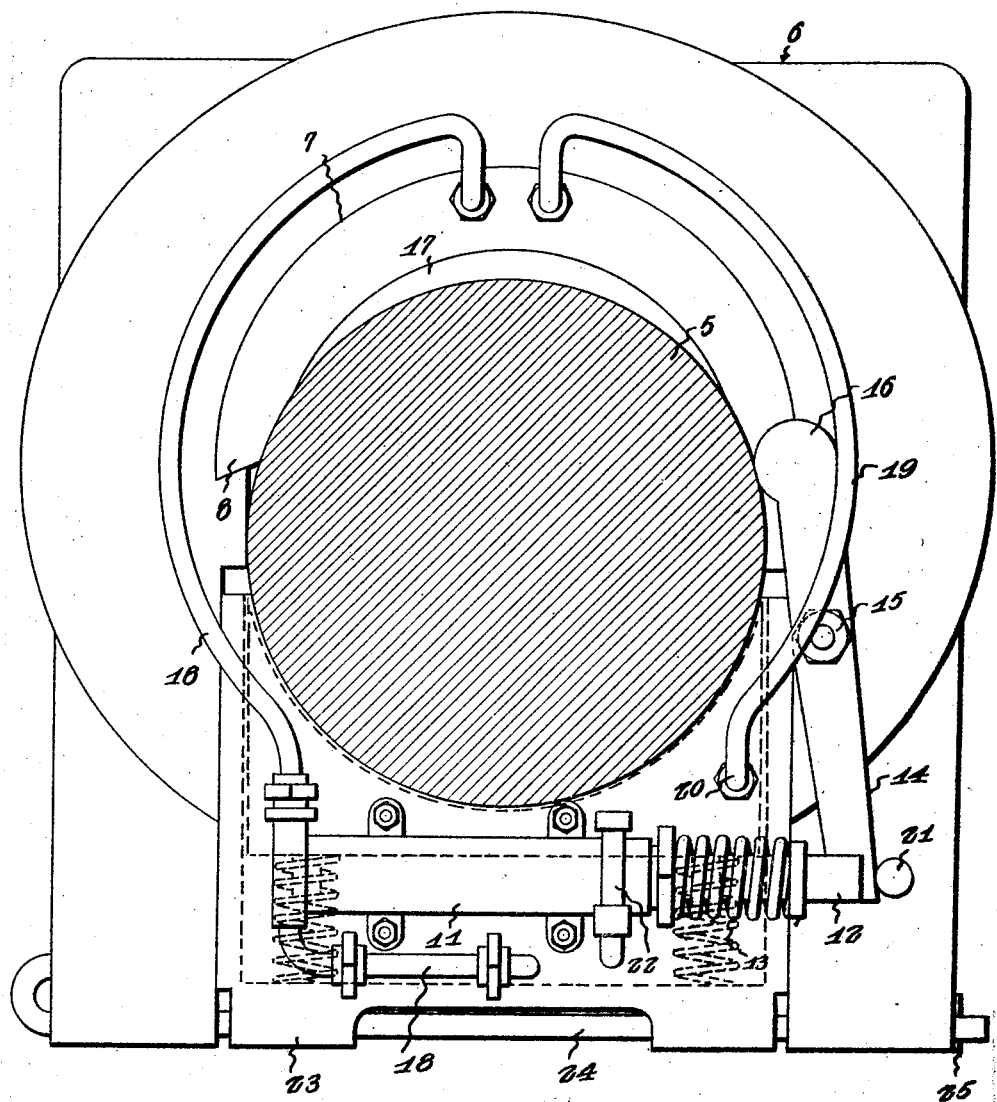

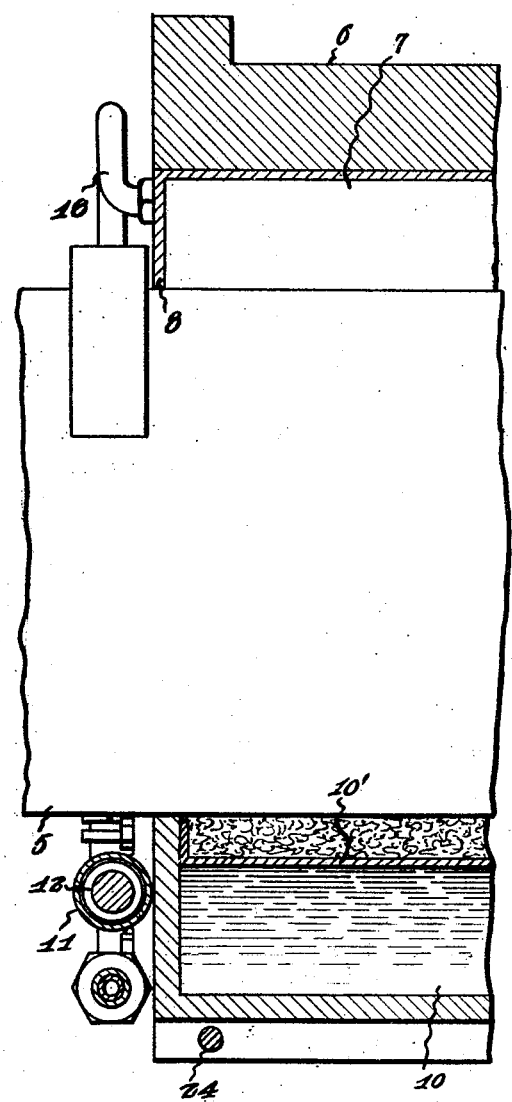
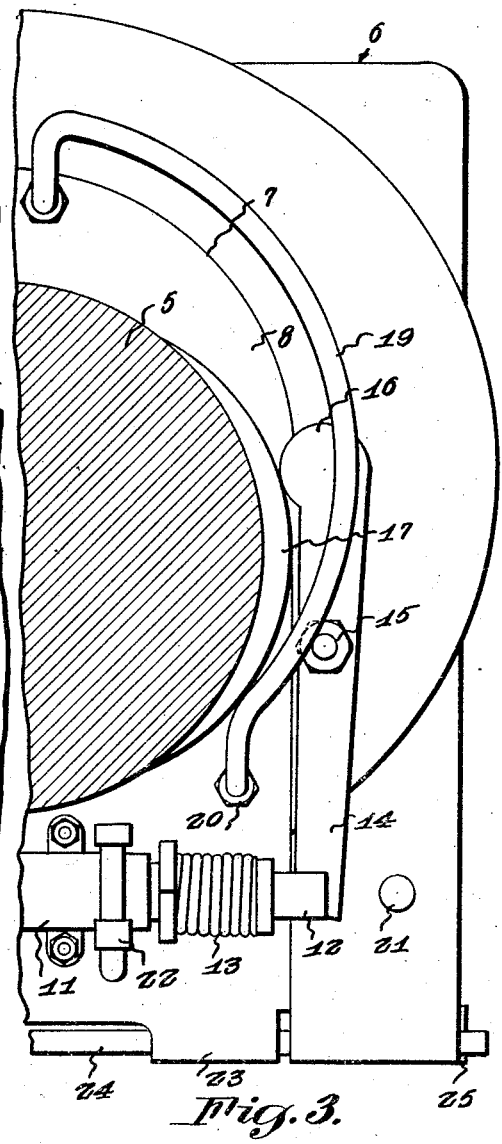
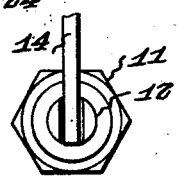

1,567,652

UNITED STATES PATENT OFFICE.

GEORGE WILLIAM KELLER, OF PORTSMOUTH, OHIO.

DRIVING AND ENGINE-TRUCK BOX LUBRICATOR.

Application filed July 19, 1924. Serial No. 727,053.

*To whom it may concern:*

Be it known that I, GEORGE W. KELLER, a citizen of the United States, residing at Portsmouth, in the county of Scioto and State of Ohio, have invented a new and useful Driving and Engine-Truck Box Lubricator, of which the following is a specification.

This invention relates to a lubricating device especially designed for use in connection with driving boxes and engine truck boxes for automatically supplying a lubricant to the shafts operating therein.

Another important object of the invention is to provide means for supplying a constant flow of lubricant to insure against overheating of the bearings while on a long run.

A still further object of the invention is to provide means for returning the surplus lubricant to the reservoir of the lubricator, should too great a quantity of lubricant be pumped to the bearing.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:—

Figure 1 is an end elevational view of a shaft and truck box in which the shaft moves.

Figure 2 is a fragramental sectional view through the truck box.

Figure 3 is an end elevational view of the shaft and truck box, illustrating the cam mounted on the shaft.

Figure 4 is an end elevational view disclosing the operating arm and connection between the operating arm and pump.

Referring to the drawing in detail, the reference character 5 indicates the drive shaft of a locomotive or the like which is shown as positioned within the driving box 6.

Positioned within the driving box is a liner indicated at 7 which is formed with a forward wall 8 that is curved to conform to the curvature of the shaft that operates therein, the liner being of a construction to provide an upper oil reservoir so that the axle moves in an oil bath, at all times.

Formed in the lower portion of the driving box is a reservoir 10 adapted to be filled with lubricating fluid which may be pumped into the liner by means of a suitable pumping mechanism to be hereinafter more fully described, and as shown a movable waste supporting tray 10' is disposed in the reservoir 10 to hold the waste up to the axle.

Mounted on the driving box 6 is a pump indicated at 11 which is provided with the usual piston 12 normally urged to its inactive position by means of the coiled spring 13 positioned on the piston 12. As clearly shown by Figure 4 of the drawings, the piston is split to accommodate the operating lever 14 so that lateral movement of the operating lever will be prevented.

This operating lever 14 is pivotally mounted at 15 to the driving box and is formed with a head 16 at one end thereof, which head contacts with the cam 17 secured to the drive shaft 5 so that upon rotary movement of the drive shaft 5, a pivotal movement of the lever 14 will be produced, to the end that the pump will operate to force liquid into the upper oil reservoir 7.

A pipe indicated at 18 has communication with the reservoir 10, and as shown, this pipe also communicates with the pump 11 at its end. A curved pipe 19 communicates with the reservoir 10 and extends upwardly, the upper end thereof being secured within the lining so that oil may be supplied to the upper reservoir.

Should too great a quantity of oil be pumped into the lining, the same may be carried off through the overflow pipe 19 which has its lower end communicating with the reservoir 10 at 20.

A stop pin 21 is disposed in the path of travel of the lever 14 to restrict movement of the lever and insure against the pump piston moving from its position within the pump cylinder.

The reference character 22 indicates the filling spout by means of which oil may be admitted to the reservoir or tank. As clearly shown by Figure 1 of the drawings, the reservoir is formed independently of the body portion of the device, the lower portion of the reservoir being provided with eyes 23 to accommodate the bolt 24 which extends through suitable openings in the body portion, the free end of the bolt being supplied with a key 25 to secure the bolt in position.

From the foregoing it will be obvious that due to this construction, a shaft will be continuously supplied with a lubricating medium, eliminating any possibility of the shaft or its bearing heating to cause undue wear.

I claim:—

In a lubricating device for shafts, a liner positioned above the shaft, said liner constituting an upper reservoir, a lower reservoir arranged under the shaft, a pipe establishing communication between the reservoirs, a pump communicating with the pipe for forcing liquid from the lower reservoir and into the upper reservoir, a piston forming a part of the pump and having a notched end portion, an arm pivotally supported adjacent to the shaft and having its lower end fitted within the notched end portion and carrying a head at the upper end thereof, a cam on the shaft for engaging the head to move the lower end of the arm inwardly to operate the pump piston, and an overflow pipe establishing communication between the reservoirs.

In testimony that I claim the foregoing as my own, I have hereto affixed my signature.

GEORGE WILLIAM KELLER.